(12) United States Patent
Lee

(10) Patent No.: US 8,229,213 B2
(45) Date of Patent: Jul. 24, 2012

(54) COLOR INTERPOLATION METHOD AND DEVICE CONSIDERING EDGE DIRECTION AND CROSS STRIPE NOISE

(75) Inventor: Ho-Young Lee, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 877 days.

(21) Appl. No.: 12/307,068

(22) PCT Filed: Jul. 25, 2007

(86) PCT No.: PCT/KR2007/003575
§ 371 (c)(1),
(2), (4) Date: Dec. 30, 2008

(87) PCT Pub. No.: WO2008/013406
PCT Pub. Date: Jan. 31, 2008

(65) Prior Publication Data
US 2009/0316984 A1 Dec. 24, 2009

(30) Foreign Application Priority Data
Jul. 25, 2006 (KR) .................. 10-2006-0069962

(51) Int. Cl.
*G06K 9/00* (2006.01)
(52) U.S. Cl. ........................... 382/162; 382/167
(58) Field of Classification Search ........... 382/162–167
See application file for complete search history.

(56) References Cited

U.S. PATENT DOCUMENTS

| | | | |
|---|---|---|---|
| 6,563,537 B1 | 5/2003 | Kawamura et al. | |
| 7,792,358 B2 * | 9/2010 | Suzuki | 382/167 |
| 2004/0246352 A1 * | 12/2004 | Suzuki | 348/272 |
| 2008/0303953 A1 * | 12/2008 | Lee | 348/607 |

FOREIGN PATENT DOCUMENTS

| | | | |
|---|---|---|---|
| JP | 2000-244934 A | 9/2000 | |
| JP | 2004-221838 A | 8/2004 | |
| JP | 2005-260557 A | 9/2005 | |

* cited by examiner

*Primary Examiner* — Jingge Wu
(74) *Attorney, Agent, or Firm* — Birch, Stewart, Kolasch & Birch, LLP

(57) ABSTRACT

A color interpolation method and a device are disclosed. The color interpolation method includes (a) setting a grid noise coefficient; (b) computing a grid noise offset by using the grid noise coefficient set in the step of (a); (c) extracting a pixel value only from a Bayer pattern image regardless of R, G and B values and computing edge directional information; (d) determining a condition of the edge directional information, computed in the step of (b), among a plurality of predetermined conditions, each of the plurality of predetermined conditions corresponding to a color interpolation parameter computing algorithm and the grid noise offset being used as a parameter of the color interpolation parameter computing algorithm corresponding to each of the conditions; and (e) computing a color interpolation parameter based on the color interpolation parameter computing algorithm corresponding to the condition of the edge directional information, determined in the step of (d).

34 Claims, 10 Drawing Sheets

Figure 3

| R | G1 | R1 | G2 | R |
|---|----|----|----|---|
| G3 | B1 | G4 | B2 | G5 |
| R2 | G6 | R3 | G7 | R4 |
| G8 | B3 | G9 | B4 | G10 |
| R | G11 | R5 | G12 | R |

Figure 4

| G | B | G1 | B | G |
|---|---|---|---|---|
| R | G2 | R1 | G3 | R |
| G4 | B1 | G5 | B2 | G6 |
| R | G7 | R2 | G8 | R |
| G | B | G9 | B | G |

Figure 6

| P  | P  | P1 | P  | P  |
|----|----|----|----|----|
| P  | P2 | P  | P3 | P  |
| P4 | P  | P5 | P  | P6 |
| P  | P7 | P  | P8 | P  |
| P  | P  | P9 | P  | P  |

Figure 7

| 0 | 11 | 0 | 11 | 0 |
|---|---|---|---|---|
| -21 | 0 | -21 | 0 | -21 |
| 0 | 41 | 0 | 41 | 0 |
| -21 | 0 | -21 | 0 | -21 |
| 0 | 11 | 0 | 11 | 0 |

Figure 8

| 7 | 0 | 7 | 0 | 7 |
|---|---|---|---|---|
| 0 | -32 | 0 | -32 | 0 |
| 28 | 0 | 28 | 0 | 28 |
| 0 | -32 | 0 | -32 | 0 |
| 7 | 0 | 7 | 0 | 7 |

COLOR INTERPOLATION METHOD AND DEVICE CONSIDERING EDGE DIRECTION AND CROSS STRIPE NOISE

CROSS-REFERENCE TO RELATED APPLICATIONS

This application claims foreign priority benefits under 35 U.S.C. .sctn. 119(a)-(d) to PCT/KR2007/003575, filed Jul. 25, 2007, which is hereby incorporated by reference in its entirety.

BACKGROUND

1. Technical Field

The present invention relates to a color interpolation device and a method more specifically to a color interpolation method and a device that can improve image quality through color interpolation.

2. Description of the Related Art

Recent development of multimedia apparatuses has allowed complex images to be processed.

FIG. 1 is a block diagram illustrating a conventional color interpolation process.

As illustrated in FIG. 1, in accordance with a conventional color interpolation processing operation, RGB data, interpolated in a color interpolation unit 100, passes through a camera signal processing (hereinafter, referred to as "CSP") intermediate processing unit 102. Then, the RGB data is converted into luminance (Y) data and chrominance (C) data in an RGB converting unit 104. Behind a video processing system, the converted Y data and C data pass through a noise removing unit 106 and undergo an edge enhancing process in an edge enhancing unit 108. In the conventional color interpolation, an effective interpolation was usually used.

FIG. 2 illustrates a resolution chart video recovered by a conventional effective interpolation method.

Referring to FIG. 2, in accordance with the conventional, typical effective interpolation method, wrong color is generated in the vicinity of minute edge having 700 or more, and zipper-shaped artifacts are generated around the edge.

In the color interpolation, since the large difference between a G value in a GB line and a G value in a RG line causes grid noise to be generated, the method of removing the grid noise is also required to be developed along with a new color interpolation method.

SUMMARY

The present invention provides a color interpolation method and a device that perform color interpolation by using edge directional information.

The present invention also provides a color interpolation method and a device that can prevent wrong color from being generated in the vicinity of minute edge.

The present invention also provides a color interpolation method and a device that can prevent zipper-shaped artifacts from being generated around the edge when a color interpolation process is performed.

In addition, the present invention provides a grid noise removing method, applicable to a color interpolation, which can prevent wrong color and zipper-shaped artifacts from being generated.

Other problems that the present invention solves will become more apparent through the following description.

To solve the above problems as described above, according to an aspect of the present invention, there is provided a color interpolation method including (a) setting a grid noise coefficient; (b) computing a grid noise offset by using the grid noise coefficient set in the step of (a); (c) extracting a pixel value only from a Bayer pattern image regardless of R, G and B values and computing edge directional information; (d) determining a condition of the edge directional information, computed in the step of (c), among a plurality of predetermined conditions, each of the plurality of predetermined conditions corresponding to a color interpolation parameter computing algorithm and the grid noise offset being used as a parameter of the color interpolation parameter computing algorithm corresponding to each of the conditions; and (e) computing a color interpolation parameter based on the color interpolation parameter computing algorithm corresponding to the condition of the edge directional information, determined in the step of (d).

According to another aspect of the present invention, there is provided a color interpolation including a noise setting unit, setting a grid noise coefficient corresponding to a Bayer pattern image; a grid noise offset computing unit, computing a grid noise offset by using the grid noise coefficient set by the noise setting unit; an edge directional information computing unit, extracting a pixel value only from the Bayer pattern image regardless of R, G and B values and computing edge directional information; an directional information condition determining unit, determining a condition of the edge directional information, computed in the edge directional information computing unit, among a plurality of predetermined conditions, each of the plurality of predetermined conditions corresponding to a color interpolation parameter computing algorithm and the grid noise offset being used as a parameter of the color interpolation parameter computing algorithm corresponding to each of the conditions; and a parameter computing unit, computing a color interpolation parameter based on the color interpolation parameter computing algorithm corresponding to the condition of the edge directional information, determined by the edge directional information condition determining unit.

BRIEF DESCRIPTION OF THE DRAWINGS

FIG. 3 illustrates a case of an R component R3 in an RG line among Bayer pattern images, inputted in a color interpolation process, being a center pixel;

FIG. 4 illustrates a Bayer pattern image in case that a G5 is a center pixel in a GB line;

FIG. 6 is an example illustrating a 5×5 mask written with only pixel values regardless of a pixel component in a Bayer matrix;

FIG. 7 illustrates an example of a grid noise coefficient in the case of an R being a center pixel in an RG line in accordance with an embodiment of the present invention;

FIG. 8 illustrates an example of a grid noise coefficient in the case of a G being a center pixel in a GB line in accordance with an embodiment of the present invention;

DETAILED DESCRIPTION

Figure 1:
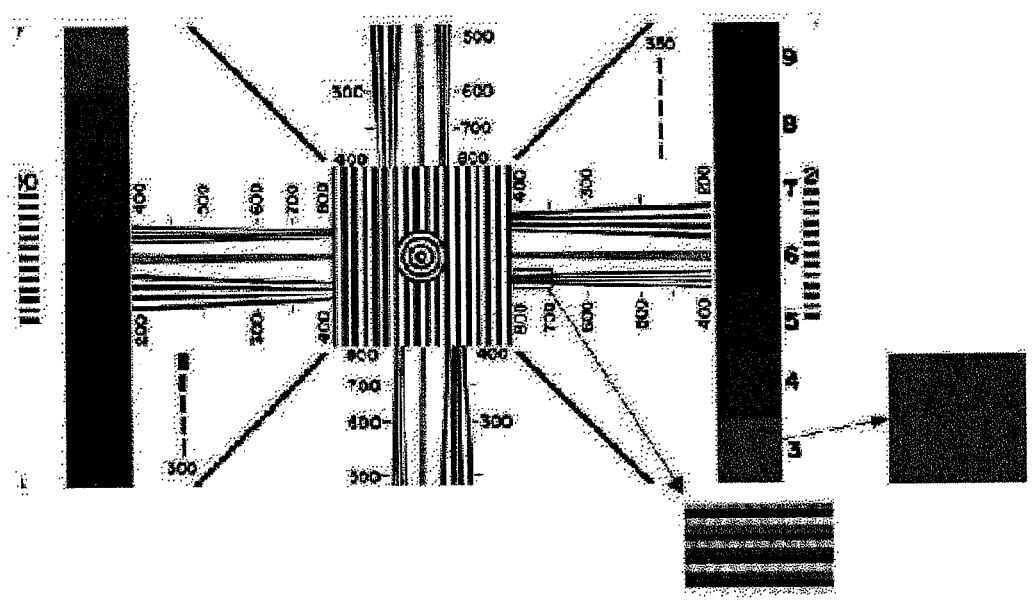
FIG. 1 is a block diagram illustrating a conventional color interpolation process.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Before describing the present invention, an effective interpolation method as a typical color interpolation method will be firstly described.

The color interpolation for an inputted 5×5 Bayer pattern image is performed.

FIG. 3 illustrates a case of an R component R3 in an RG line among Bayer pattern images, inputted in a color interpolation process, being a center pixel.

Described first will be a typical interpolation method of a case in which R3 is a center pixel, as illustrated in FIG. 3.

Parameters Rn, Rw, Rs and Re and Kr1, Kr2, Kr3 and Kr4 are computed in case that an R component is a center pixel in a Bayer pattern.

The parameters Rn, Rw, Rs and Re are computed by the following Formula 1.

$$Rn = \frac{R1 + R3}{2}$$ [Formula 1]

$$Rw = \frac{R2 + R3}{2}$$

$$Rs = \frac{R3 + R5}{2}$$

$$Re = \frac{R3 + R4}{2}$$

Also, the parameters Kr1, Kr2, Kr3 and Kr4 are computed by the following Formula 2.

$$Kr1 = G4 - Rn$$

$$Kr2 = G6 - Rw$$

$$Kr3 = G9 - Rs$$

$$Kr4 = G7 - Re$$ [Formula 2]

If the parameters Rn, Rw, Rs and Re and Kr1, Kr2, Kr3 and Kr4 are computed by the Formula 1 and Formula 2, respectively, the final output value of a G component can be computed.

Gout, the final output value of the G component, is computed by the following Formula 3.

$$Gout = R3 + \frac{(Kr1 + Kr2 + Kr3 + Kr4)}{4}$$ [Formula 3]

To evaluate the final output value of an interpolated B component, parameters Gwn, Gws, Ges and Gen and Kb1, Kb2, Kb3 and Kb4 must be computed.

The parameters Gwn, Gws, Ges and Gen are computed by the following Formula 4.

$$Gwn = \frac{G1 + G3 + G6 + G4}{4}$$ [Formula 4]

$$Gws = \frac{G6 + G8 + G11 + G9}{4}$$

$$Ges = \frac{G7 + G9 + G12 + G10}{4}$$

$$Gen = \frac{G2 + G4 + G7 + G5}{4}$$

The parameters Kb1, Kb2, Kb3 and Kb4 are also computed by the following Formula 5.

$$Kb1 = Gwn - B1$$

$$Kb1 = Gwn - B1$$

$$Kb2 = Gen - B2$$

$$Kb3 = Gws - B3$$

$$Kb4 = Ges - B4 \quad \text{[Formula 5]}$$

If the parameters computed by the Formula 4 and Formula 5 are used, an output value of the interpolated B component can be evaluated by the following Formula 6.

$$Bout = Gout - \frac{(Kb1 + Kb2 + Kb3 + Kb4)}{4} \quad \text{[Formula 6]}$$

In the meantime, an output value of the interpolated R component is identical to the R3, a center pixel, as shown in the following Formula 7.

$$Rout = R3 \quad \text{[Formula 7]}$$

The case of the R component being the center pixel has been already described with reference to FIG. 3. Considering that the R component and the B component exchange their positions with each other in the Bayer pattern image, the same method can be applied to the case of the center pixel being the B component in a GB line.

Next, the typical interpolation method in case that G5 is the center pixel in the GB line will be described.

FIG. 4 illustrates a Bayer pattern image in case that G5 is a center pixel in a GB line.

In case that the G component is the center pixel in the GB line of the Bayer pattern, parameters Gn, Gw, Gs and Ge and Kr1, Kr2, Kb1 and Kb2 are computed.

The parameters Gn, Gw, Gs and Ge are computed by the following Formula 8.

$$Gn = \frac{G1 + G2 + G5 + G3}{4}$$
$$Gw = \frac{G2 + G4 + G7 + G5}{4}$$
$$Gs = \frac{G5 + G7 + G9 + G8}{4}$$
$$Ge = \frac{G3 + G5 + G8 + G6}{4} \quad \text{[Formula 8]}$$

The parameters Kr1, Kr2, Kb1 and Kb2 are also computed by the following Formula 9.

$$Kr1 = Gn - R1$$

$$Kr2 = Gs - R2$$

$$Kb1 = Gw - B1$$

$$Kb2 = Ge - B2 \quad \text{[Formula 9]}$$

If the parameters Gn, Gw, Gs and Ge and Kr1, Kr2, Kb1 and Kb2 are computed by the Formula 8 and Formula 9, respectively, the interpolated final output value of R, G and B components can be computed.

Gout, the final output value of the G component, is identical to the G5 as shown in the following Formula 10.

$$Gout = G5 \quad \text{[Formula 10]}$$

Rout, the final output value of the R Component, is computed by the following Formula 11.

$$Rout = G5 - \frac{(Kr1 + Kr2)}{2} \quad \text{[Formula 11]}$$

Finally, Bout, the final output value of the B component, is computed by the following Formula 12.

$$Bout = G5 - \frac{(Kb1 + Kb2)}{2} \quad \text{[Formula 12]}$$

The case of the G component being the center pixel in the GB line was described with reference to FIG. 4. Considering that the R component and the B component exchange their positions with each other in the Bayer pattern image, the same method can be applied to the case of the G component being the center pixel in an RG line.

The above description is related to the previously used typical effective interpolation.

As described above, in accordance with the conventional interpolation method, as shown in a resolution chart video of FIG. 1, wrong color is generated in the vicinity of minute edge having 700 or more. Beside that, zipper-shaped artifacts are generated in the vicinity of edge.

To solve these problems, the present invention computes a new parameter of edge directional information and calculates color interpolation parameters by each different method according to the edge directional information.

Since the color interpolation is performed by using the edge directional information, a grid noise removing method different from the conventional method is needed. Accordingly, the present invention suggests the method of removing grid noise from the method of performing the color interpolation by using the edge directional information.

To compute the edge directional information, a 5×5 mask having a pixel value of each component only is used regardless of the R, G and B components of a Bayer pattern.

Figure 5:
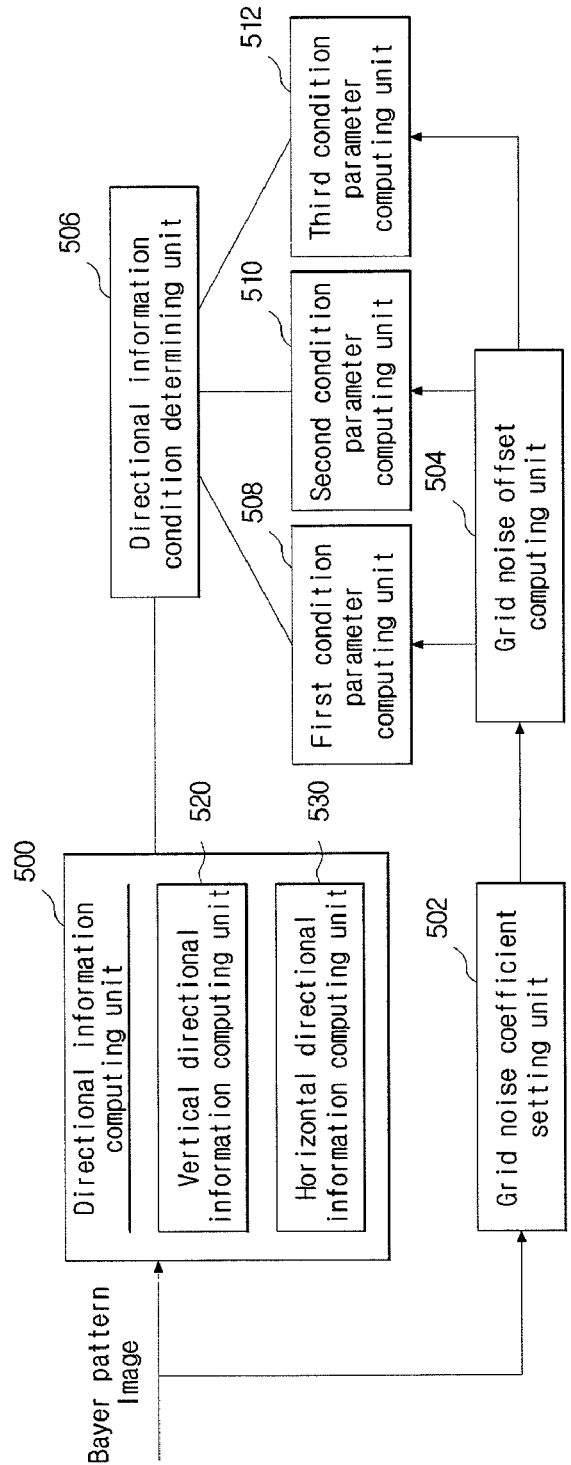
FIG. 5 illustrates the structure of a color interpolation device considering grid noise and edge directional information in accordance with an embodiment of the present invention.

FIG. 6 is an example illustrating a 5×5 mask written with only pixel values regardless of a pixel component in a Bayer matrix;

FIG. 5 illustrates the structure of a color interpolation device considering grid noise and edge directional information in accordance with an embodiment of the present invention;

Referring to FIG. 5, the color interpolation device in accordance with an embodiment of the present invention can include a directional information computing unit 500, a grid noise coefficient setting unit 502, a grid noise offset computing unit 504, a directional information condition determining unit 506, a first condition parameter computing unit 508, a second condition parameter computing unit 510 and a third condition parameter computing unit 512. The directional information computing unit 500 can include a vertical directional information computing unit 520 and a horizontal directional information computing unit 530.

The directional information computing unit 500 computes edge directional information. The edge directional information is extracted by using a 5×5 mask value, illustrated in FIG. 5. The vertical directional information computing unit 520 computes edge vertical directional information, and the horizontal directional information computing unit 530 computes edge horizontal directional information. The horizontal and vertical directional information is a numerically expressed integer.

In accordance with an embodiment of the present invention, the edge vertical directional information is computed by using the difference in vertically disposed pixel values in a 5×5 mask, and the edge horizontal directional information is computed by using the difference in horizontally disposed pixel values in the 5×5 mask.

The more detailed method for computing the vertical directional information and the horizontal directional information will be described through additional drawings.

The grid noise coefficient setting unit 502 functions to set a coefficient for grid noise offset computation used for removing grid noise.

The grid noise coefficient can be determined by computing a pixel average value of each line of a Bayer pattern image, estimating a line by use of the computed average value and computing the difference between the average value and the line estimation value.

A case of G being a center pixel in a GB line (or G being a center pixel in a RG line) will be firstly described.

In case that the G is the center pixel in the GB line (or the G is the center pixel in the RG line), the average value of each line of the Bayer pattern image is computed by the following Formulas 13 through 17.

$$\frac{G1+G2+G3}{3} \qquad \text{[Formula 13]}$$

$$\frac{G4+G5}{2} \qquad \text{[Formula 14]}$$

$$\frac{G6+G7+G8}{3} \qquad \text{[Formula 15]}$$

$$\frac{G9+G10}{2} \qquad \text{[Formula 16]}$$

$$\frac{G11+G12+G13}{3} \qquad \text{[Formula 17]}$$

Lines arranged between each adjacent line are estimated by using the computed average values of each adjacent line. For example, a second line is estimated by using an average value of first and third lines, a third line is estimated by using an average value of second and fourth lines and a fourth line is estimated by using an average value of the third and fifth lines. In other words, since the differences of average values occur in even-numbered lines due to having no information related to odd-numbered lines (or in odd-numbered lines due to having no information related to even-numbered lines), the lines arranged between each adjacent line are firstly estimated.

The estimation values of the second line, the third line and the fourth line are computed by the following formulas 18 through 20.

$$\frac{G1+G2+G3+G6+G7+G8}{6} \qquad \text{[Formula 18]}$$

$$\frac{G4+G5+G9+G10}{4} \qquad \text{[Formula 19]}$$

$$\frac{G6+G7+G8+G11+G12+G13}{6} \qquad \text{[Formula 20]}$$

If the average values of each adjacent line and the estimation values using the average values of each adjacent line are computed, the differences between the estimation values and the average values are computed. When the differences between the estimation values and the average values of the second line, the third line and the fourth line are computed, the average values are subtracted from the estimation values for the even-numbered lines, but the estimation values are subtracted from the average value for the odd-numbered lines. This is because while the average values are typically smaller than the estimation values in the odd-numbered line, the average values are typically larger than the estimation values in the even-numbered line.

The differences between the estimation values and the average values of the second line, the third line and the fourth line can be computed by the following Formulas 21 through 23.

$$\frac{G1+G2+G3+G6+G7+G8}{6} - \frac{G4+G5}{2} = \frac{2 \times (G1+G2+G3+G6+G7+G8) - 6 \times (G4+G5)}{12} \qquad \text{[Formula 21]}$$

$$\frac{G4+G5+G6+G7+G8}{3} - \frac{G9+G10}{4} = \frac{4 \times (G6+G7+G8) - 3 \times (G4+G5+G9+G10)}{12} \qquad \text{[Formula 22]}$$

$$\frac{G6+G7+G8+G11+G12+G13}{6} - \frac{G9+G10}{2} = \frac{2 \times (G6+G7+G8+G11+G12+G13) - 6 \times (G9+G10)}{12} \qquad \text{[Formula 23]}$$

The grid noise coefficient is computed by using the Formulas 21 through 23. Particularly, it is one of good examples that the grid noise coefficient is set as the half of the average value of the Formulas 21 through 23, but the setting value can be changed as necessary.

m, the grid noise coefficient, computed by using the Formulas 21 through 23, is computed by the following Formula 24.

$$m = \frac{2G1+2G2+2G3-9G4-9G5+8G6+8G7+8G8-9G9-9G10+2G11+2G12+2G13}{12 \times 3 \times 2} \qquad \text{[Formula 24]}$$

If the above Formula 24 is optimized, the following Formula 25 is deduced.

$$m = \frac{7G1+7G2+7G3-32G4-32G5+28G6+28G7+28G8-32G9-32G10+7G11+7G12+7G13}{256} \qquad \text{[Formula 25]}$$

Figure 8:
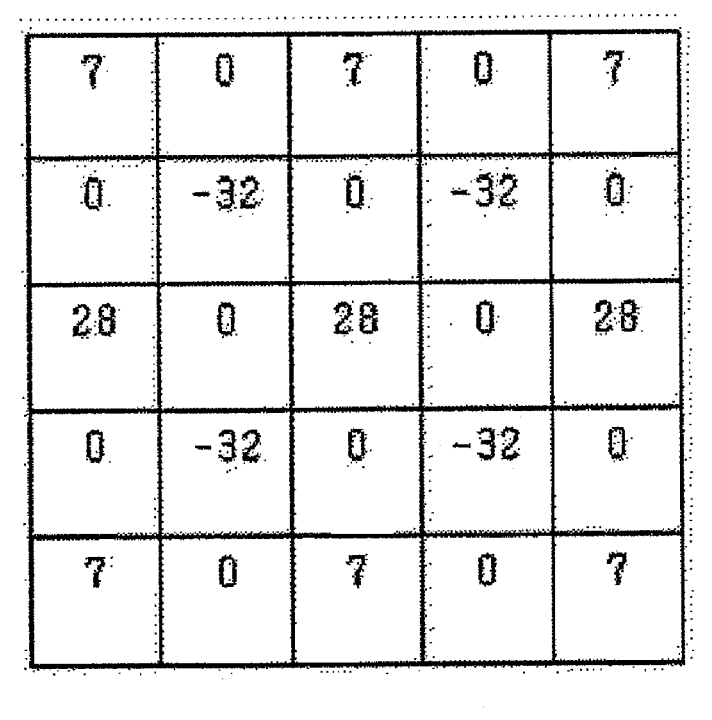

In case where the G is the center pixel in the GB line (or the G is the center pixel in the RG line), the grid noise coefficient is set by using the result of the above Formula 25. This is represented in the form of a 5×5 mask as shown in FIG. 8.

If the G component is not the center pixel, that is, an R is the center pixel in the RG line (or a B is the center pixel in the GB line), the grid noise coefficient is computed through the same deducing process as described above.

In other words, the grid noise coefficient is computed through the grid noise coefficient computing operation by computing a pixel average value of each line of a Bayer pattern image, estimating a line and computing the difference between the average value and the line estimation value. In this case, the grid noise coefficient is computed by the following Formula 26.

$$m=(11\times G1+11\times G2-21\times G3-21\times G4-21\times G5+41\times G6+41\times G7-21\times G8-21\times G9-21\times G10+11\times G11+11\times G12)/256 \quad \text{[Formula 26]}$$

In case where the R is the center pixel in the RG line (or the B is the center pixel in the GB line), the grid noise coefficient computed by using the above Formula 26 is represented in the form of a 5×5 mask as shown in FIG. 7.

The grid noise coefficient setting unit 502 pre-sets the grid noise coefficient, deduced through the same process as described above, in the forms of FIG. 7 and FIG. 8, and the grid noise offset computing unit 504 computes a grid noise offset by applying the grid noise coefficient, set as shown in FIG. 7 and FIG. 8, to the Bayer pattern image.

The grid noise offset computing Formulas are the same as the Formulas 25 and 26 used in the grid noise coefficient deducing process. However, the grid noise offset computing unit 504 determines whether the computed grid noise offset is larger than a predetermined threshold g_threshold, and if the computed grid noise offset is larger than a predetermined threshold, sets a grid noise offset value by the following Formula 27.

$$g\_offset=\text{sign}(g\_offset)\times g\_threshold \quad \text{[Formula 27]}$$

In the above Formula 27, if the grid noise offset is larger than zero, the sign is outputted as 1. If the grid noise offset is smaller than 0, the sign is outputted as −1. If the grid noise offset is zero, the sign is outputted as zero.

It shall be also evident to any person of ordinary skill in the art that the grid noise threshold value is adjustable as necessary in the above Formula 27.

The directional information condition determining unit 506 determines which one of the predetermined conditions the directional information, computed in the directional information computing unit 500, belongs to.

Here, the first condition of the predetermined conditions satisfies the case of the vertical directional information being larger than a first threshold and the horizontal directional information being larger than a second threshold.

In case that the vertical directional information and the horizontal directional information, extracted in the directional information computing unit 500, are satisfied with the first condition, the directional information condition determining unit 506 controls the first condition parameter computing unit 508 to compute a color interpolation parameter.

The second condition of the predetermined conditions satisfies the case of the vertical directional information being larger than the horizontal directional information.

In case that the vertical directional information and the horizontal directional information, extracted in the directional information computing unit 500, are satisfied with the second condition, the directional information condition determining unit 506 controls the second condition parameter computing unit 510 to compute the color interpolation parameter.

However, in case that the output value of the directional information computing unit 500 satisfies both the first condition and the second condition, the directional information condition determining unit 506 controls the first condition parameter computing unit 508 to compute the color interpolation parameter.

The third condition of the predetermined conditions is related to the case of the vertical directional information and the horizontal directional information satisfying neither the first condition nor the second condition. In this case, the directional information condition determining unit 506 controls the third condition parameter computing unit 508 to compute the color interpolation parameter.

The first condition parameter computing unit 508, the second condition parameter computing unit 510 and the third condition parameter computing unit 512 compute the color interpolation according to a predetermined computing method.

The first condition parameter computing unit 508, the second condition parameter computing unit 510 and the third condition parameter computing unit 512 compute the color interpolation parameter by distinguishing a case of R being the center pixel in the RG line (B is the center pixel in a GB line) and a case of G being the center pixel in the GB line (G is the center pixel in the RG line).

The first condition parameter computing unit 508, the second condition parameter computing unit 508 and the third condition parameter computing unit 512 compute the parameters Gout, Gwn, Gws, Ges and Gen by each different method in case that R3 is the center pixel in the RG line (B is the center pixel in a GE line) and compute the parameters Gn, Gw, Gs and Ge by each different method in case that G5 is the center pixel in the GB line (G is the center pixel in the RG line), as compared with the conventional effective color interpolation method.

The Formulas by which the aforementioned color interpolation parameters are computed will be described later in detail.

Figure 9:
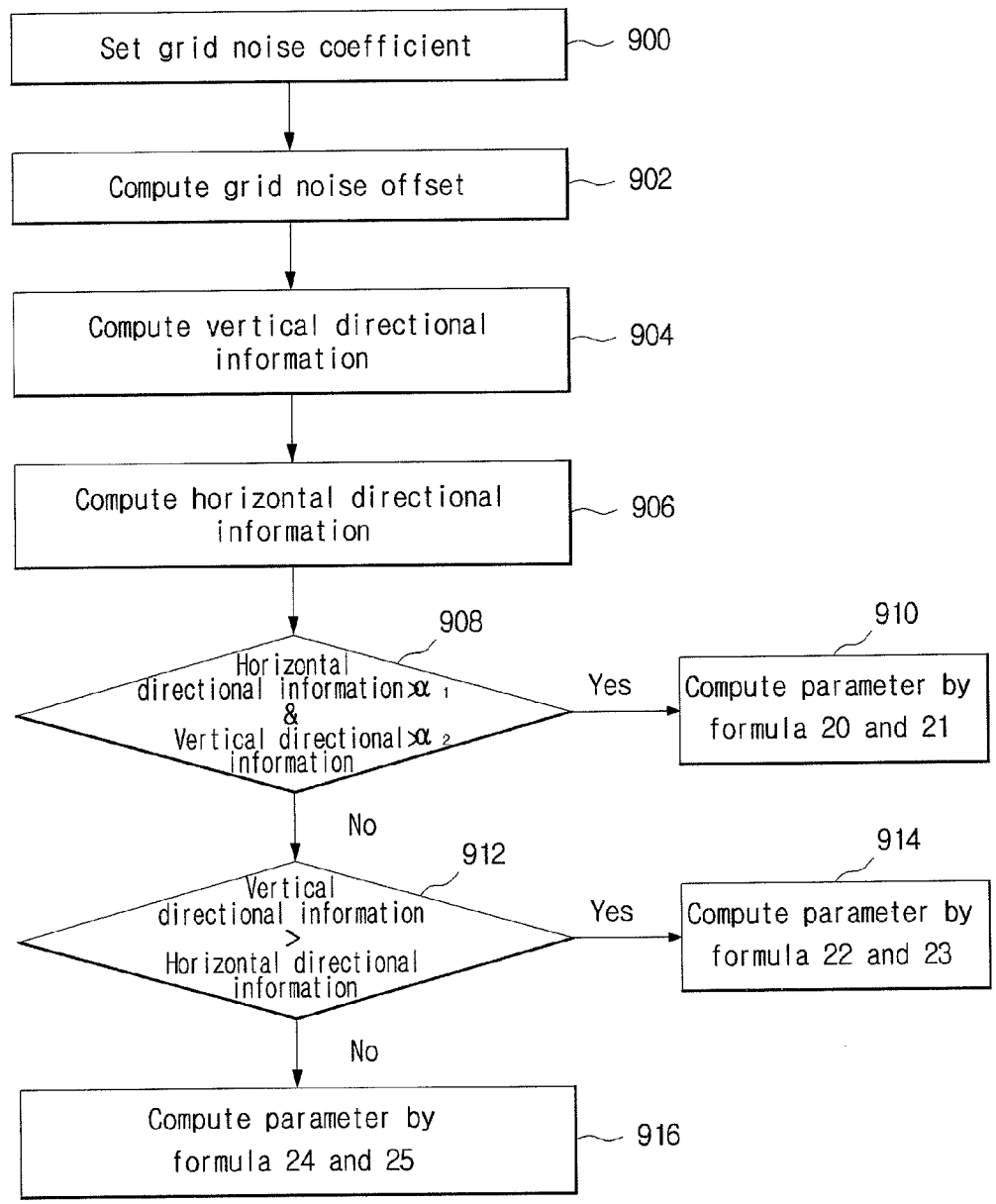
FIG. 9 is a flow chart illustrating a general flow of a color interpolation method considering grid noise and edge directional information in accordance with an embodiment of the present invention.

FIG. 9 is a flow chart illustrating a general flow of a color interpolation method considering grid noise and edge directional information in accordance with an embodiment of the present invention.

Referring to FIG. 9, a gird noise coefficient is set according to the form of a Bayer pattern image by analyzing the Bayer pattern image in a step presented by 900. It is determined whether R is a center pixel in an RG line (or B is a center pixel in a GB line) or G is a center pixel in a GB line (or G is a center pixel in an RG line) in the Bayer pattern image. If R is the center pixel in the RG line (or B is the center pixel in the GB line), the grid noise coefficient is set as shown in FIG. 7. If G is the center pixel in the GB line (or G is the center pixel in an RG line), the grid noise coefficient is set as shown in FIG. 8.

If the grid noise coefficient is set, a grid noise offset is computed in a step represented by 902. As described above, the grid noise offset is computed by using the Formula 25 or 26 according to the case that R is the center pixel in the RG line (or B is the center pixel in the GB line) or G is the center pixel in the GB line (or G is the center pixel in the RG line) in the Bayer pattern image. The grid noise offset is also set by use of the Formula 27 by determining whether the grid noise offset is larger than a predetermined threshold.

Along with the grid noise offset, edge directional information is computed and edge vertical directional information of the edge directional information is computed, in a step represented by 904.

To compute the vertical directional information, two parameters delta_V1 and delta_V2 are computed. The two parameters delta_V1 and delta_V2 are computed by the following Formula 28.

$$\text{delta\_V1} = \frac{(|P5-P1|+|P5-P9|)}{2} \quad \text{[Formula 28]}$$

$$\text{delta\_V2} = \frac{(|P2-P7|+|P3-P8|)}{2}$$

As shown in the Formula 28, the parameter delta_V1 is computed by using the values of pixels disposed above and below the center pixel, and the parameter delta_V2 is computed by using the values of pixels provided in two rows adjacent to the center row.

By using the two parameters delta_V1 and delta_V2, computed by Formula 28, the vertical directional information, V_comp, is computed by the following Formula 29.

$$V\_comp = \text{delta\_V1} + \text{delta\_V2} \quad \text{[Formula 29]}$$

When it comes to Formulas for computing the vertical directional information, the delta_V1 and the delta_V2, the present invention is not limited to the aforementioned Formulas. It shall be also evident to any person of ordinary skill in the art that they can be computed in various ways by using the parameters used in the aforementioned Formulas. For example, the delta_V1 and the delta_V2 can be divided by another integer instead of 2. Alternatively, a value that is not divided by 2 can be used.

If the vertical directional information is computed, the horizontal directional information is computed in a step represented by 906.

To compute the horizontal directional information, two parameters delta_H1 and delta_H2 are computed. The two parameters delta_H1 and delta_H2 are computed by the following Formula 30.

$$\text{delta\_H1} = \frac{(|P5-P4|+|P5-P6|)}{2} \quad \text{[Formula 30]}$$

$$\text{delta\_H2} = \frac{(|P2-P3|+|P7-P8|)}{2}$$

As shown in the Formula 30, the parameter delta_H1 is computed by using the values of pixels disposed in opposite sides of the center pixel, and the parameter delta_H2 is computed by using the values of pixels in columns provided above and below the center column.

By using the two parameters delta_H1 and delta_H2, computed by Formula 30, the horizontal directional information, H_comp, is computed by the following Formula 31.

$$H\_comp = \text{delta\_H1} + \text{delta\_H2} \quad \text{[Formula 31]}$$

If the vertical directional information and the horizontal directional information are computed, in a step represented by 908, it is determined whether the first condition satisfies the case of the horizontal directional information being larger than a first threshold a1 and the horizontal directional information being larger than a second threshold a2.

In case that the vertical directional information and the horizontal directional information satisfy the first condition, and R3 is the center pixel in the RG line, the parameters Gwn, Gws, Ges, Gen, Gout and Bout are computed by Formula 32. In addition to the foregoing parameters, other parameters are computed by the same method as the parameter computing formulas of the conventional effective color interpolation, described through Formulas 1 through 12.

$$Gwn = \frac{(G1+G3+G6+G4)}{4} \quad \text{[Formula 32]}$$

$$Gws = \frac{G6+G8+G11+G9}{4}$$

$$Ges = \frac{(G7+G9+G12+G10)}{4}$$

$$Gen = \frac{(G2+G4+G7+G5)}{4}$$

$$Gout = R3 + \frac{(Kr1+Kr2+Kr3+Kr4)}{4}$$

$$Bout = Gout - \frac{(Kb1+Kb2+Kb3+Kb4)}{4}$$

The identical method can be applied to the case of B being the center line in the GB line, considering that the R and B exchange their positions with each other.

In case that the vertical directional information and the horizontal directional information satisfy the first condition, and G is the center pixel in the GB line, the Gn, Gw, Gs, Ge, Rout and Bout are computed by Formula 33. Aside from the foregoing the parameters Gn, Gw, Gs, Ge, Rout and Bout, other parameters can be computed by the same method as the parameter computing formulas of the conventional effective color interpolation.

$$Gn = \frac{(G1+G2+G5+G3)}{4} \quad \text{[Formula 33]}$$

$$Gw = \frac{(G2+G4+G7+G5)}{4}$$

$$Gs = \frac{(G5+G7+G9+G8)}{4}$$

$$Ge = \frac{(G3+G5+G8+G6)}{4}$$

$$Rout = G5 - \frac{(Kr1+Kr2)}{2}$$

$$Bout = G5 - \frac{(Kb1+Kb2)}{2}$$

The same method as Formula 33 can be applied to the case of G being the center line in the RG line.

In case that the vertical directional information and the horizontal directional information do not satisfy the first condition, it is determined whether a second condition, in which the vertical directional information is larger than the horizontal directional information, is satisfied in a step represented by 912.

In case that the second condition is satisfied, and R is the center pixel in the RG line, the Gwn, Gws, Ges, Gen, Gout and Bout are computed by the following Formula 34.

$$Gwn = \frac{(G3+G4)}{2} \quad \text{[Formula 34]}$$

$$Gws = \frac{(G8+G9)}{2}$$

$$Ges = \frac{(G9+G10)}{2}$$

$$Gen = \frac{(G4+G5)}{2}$$

$$Gout = R3 + \frac{(Kr2+Kr4)}{2} - g\_offset$$

$$Bout = Gout - \frac{(Kb1 + Kb2 + Kb3 + Kb4)}{4} + g\_offset$$

The identical method can be applied to the case of B being the center line in the GB line, considering that R and B exchange their positions with each other.

In case that the vertical directional information and the horizontal directional information satisfy the second condition, and G is the center pixel in the GB line, the Gn, Gw, Gs, Ge, Rout and Bout are computed by Formula 35.

$$Gn = \frac{(G2 + G3)}{2}$$ [Formula 35]

$$Gw = \frac{(G4 + G5)}{2}$$

$$Gs = \frac{(G7 + G8)}{2}$$

$$Ge = \frac{(G5 + G6)}{2}$$

$$Rout = G5 - \frac{(Kr1 + Kr2)}{2} - g\_offset$$

$$Bout = Gout - \frac{(Kb1 + Kb2 + Kb3 + Kb4)}{4} - g\_offset$$

The same method as Formula 35 can be applied to the case of G being the center pixel in the RG line.

In case that the vertical directional information and the horizontal directional information do not satisfy the first condition and the second condition, and R is the center pixel in the RG line, the Gwn, Gws, Ges, Gen, Gout and Bout are computed by the following Formula 36.

$$Gwn = \frac{(G1 + G6)}{2}$$ [Formula 36]

$$Gws = \frac{(G6 + G11)}{2}$$

$$Ges = \frac{(G7 + G12)}{2}$$

$$Gen = \frac{(G2 + G7)}{2}$$

$$Gout = R3 + \frac{(Kr1 + Kr3)}{2} + g\_offset$$

$$Bout = Gout - \frac{(Kb1 + Kb2 + Kb3 + Kb4)}{4} + g\_offset$$

The identical method can be applied to the case of B being the center line in the GB line, considering that the R and B exchange their positions with each other.

In case that the vertical directional information and the horizontal directional information satisfy the second condition, and G is the center pixel in the GB line, the Gn, Gw, Gs, Ge, Rout and Bout are computed by Formula 37.

$$Gn = \frac{(G1 + G5)}{2}$$ [Formula 37]

$$Gw = \frac{(G2 + G7)}{2}$$

$$Gs = \frac{(G5 + G9)}{2}$$

$$Ge = \frac{(G3 + G8)}{2}$$

$$Rout = G5 - \frac{(Kr1 + Kr2)}{2} + g\_offset$$

$$Bout = G5 - \frac{(Kb1 + Kb2)}{2} - g\_offset$$

The same method as Formula 37 can be applied to the case of G being the center pixel in the RG line.

In the meantime, if G is the center pixel in the GB line (or G is the center pixel in the RG line), Gout is computed by using the following Formula 38 regardless of the foresaid first condition through third condition.

$$Gout = G5 - g\_offset$$ [Formula 38]

Figure 10:
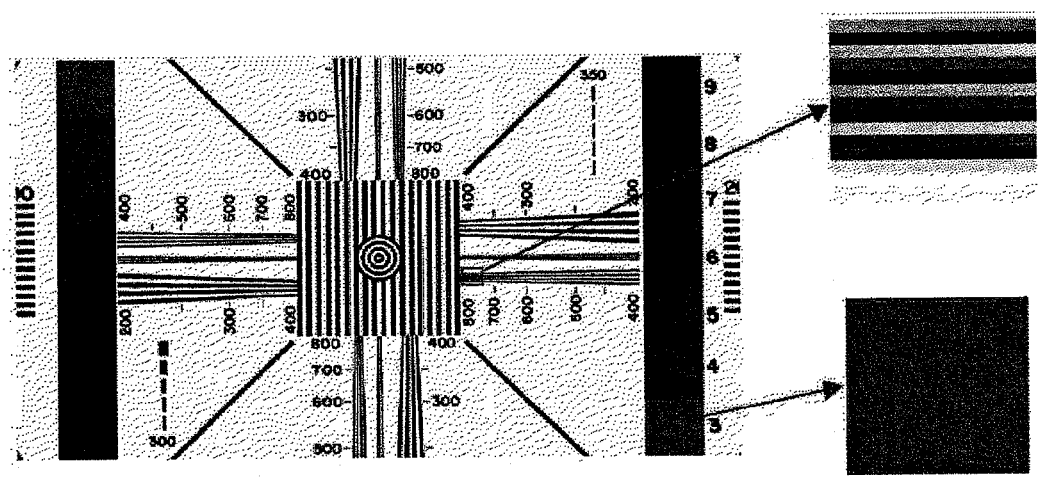
FIG. 10 illustrates a resolution chart image when a color interpolation method considering grid noise and edge direction is applied in accordance with the present invention.

FIG. 10 illustrates a resolution chart image when a color interpolation method considering grid noise and edge directional information is applied in accordance with the present invention.

Figure 2:
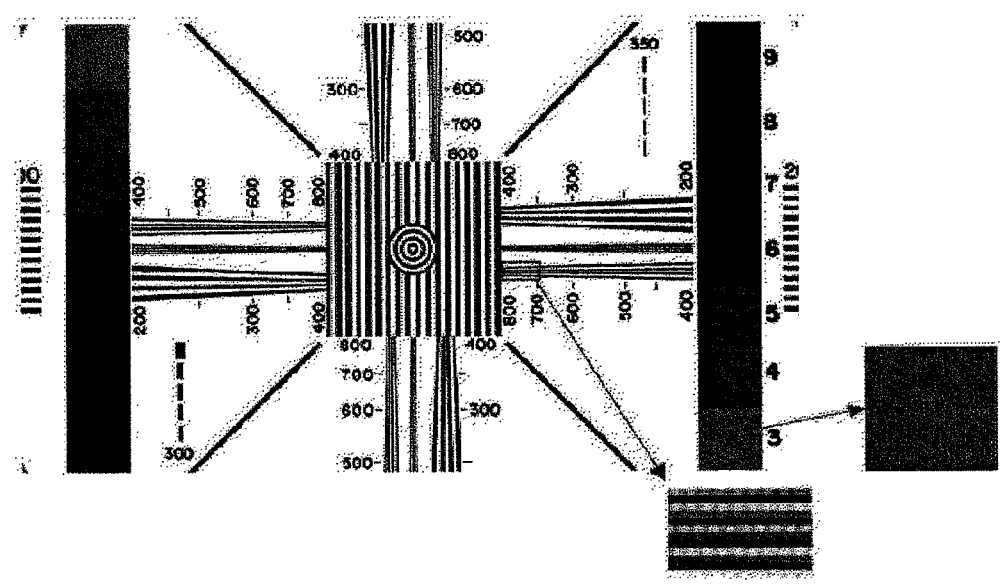
FIG. 2 illustrates a resolution chart video recovered by a conventional effective interpolation method.

In the case of FIG. 2, in which the conventional color interpolation method is applied, wrong color was generated in the vicinity of minute edge having 700 or more. Besides, zipper-shaped artifacts were generated in the vicinity of edge. However, in the case of recovering with the color interpolation method of the present invention, most of the original colors are recovered without generating wrong color in the vicinity of minute edge, and the zipper-shaped artifacts are not generated. Similar to the existing color interpolation method, it can be recognized that the same quality color is recovered without deformation when color video such as a flower image is applied. Beside that, it can be recognized that the grid noise, generated by the difference between G values in the GB line and RG line is also removed.

The present invention can prevent wrong color from being generated in the vicinity of minute edge and zipper-shaped artifacts from being generated in the vicinity of edge, by using edge directional information and computing parameters by each different algorithm according to conditions of the edge directional information. Beside that, when a new color interpolation method is applied, the present invention can remove grid noise generated in the case of the large difference occurring between G values in a GB line and an RG line.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A color interpolation method considering grid noise and edge direction, comprising:
   (a) setting a grid noise coefficient;
   (b) computing a grid noise offset by using the grid noise coefficient set in the step of (a);
   (c) extracting a pixel value only from a Bayer pattern image regardless of R, G and B values and computing edge directional information;
   (d) determining a condition of the edge directional information, computed in the step of (c), among a plurality of predetermined conditions, each of the plurality of predetermined conditions corresponding to a color interpolation parameter computing algorithm and the grid noise offset being used as a parameter of the color interpolation parameter computing algorithm corresponding to each of the conditions; and (e) computing a color interpolation parameter based on the color interpolation parameter computing algorithm corresponding to the condition of the edge directional information, determined in the step of (d).

2. The color interpolation method of claim 1, wherein the edge directional information comprises edge vertical directional information and edge horizontal directional information.

3. The color interpolation method of claim 1, wherein the grid noise coefficient is differently set depending on the cases of an R component being a center pixel in an RG line and a G component being a center pixel in a GB line.

4. The color interpolation method of claim 3, wherein the grid noise coefficient is set by computing an average value of each line of a Bayer pattern image, computing a line estimation value by use of the computed average value and using information computing the difference between the average value and the estimation value.

5. The color interpolation method of claim 4, wherein the grid noise coefficient is set as shown in the following matrix in the case of the R component being the center pixel in the RG line

| 0 | 11 | 0 | 11 | 0 |
|---|---|---|---|---|
| −21 | 0 | −21 | 0 | −21 |
| 0 | 41 | 0 | 41 | 0 |
| −21 | 0 | −21 | 0 | −21 |
| 0 | 11 | 0 | 11 | 0 | and is set as shown in the following matrix in the case of the G component being the center pixel in the GB line:

| 7 | 0 | 7 | 0 | 7 |
|---|---|---|---|---|
| 0 | −32 | 0 | −32 | 0 |
| 28 | 0 | 28 | 0 | 28 |
| 0 | −32 | 0 | −32 | 0 |
| 7 | 0 | 7 | 0 | 7. |

6. The color interpolation method of claim 4, wherein if the R component is the center pixel in the RG line, the grid noise offset g_offset is computed by a value which is evaluated by allowing the Bayer pattern image matrix to be multiplied by the grid noise coefficient matrix, whereas if the grid noise offset is larger than a predetermined threshold, the grid noise offset is reset by the following Formula:

$$g\_offset = sign(g\_offset) \times g\_threshold$$

and the sign (g_offset) is outputted as 1 if the computed grid noise offset is larger than zero, as −1 if the grid noise offset is smaller than zero and as zero if the grid noise offset is zero.

7. The color interpolation method of claim 5, wherein if the G component is the center pixel in the GB line, the grid noise offset g_offset is computed by a value which is evaluated by allowing the Bayer pattern image matrix to be multiplied by the grid noise coefficient matrix, whereas if the grid noise offset is larger than a predetermined threshold, the grid noise offset is reset by the following Formula $$g\_offset = sign(g\_offset) \times g\_threshold$$

and the sign (g_offset) is outputted as 1 if the computed grid noise offset is larger than zero, as −1 if the grid noise offset is smaller than zero and as zero if the grid noise offset is zero.

8. The color interpolation method of claim 2, wherein delta_V1 and delta_V2 are computed by the following Formulas, respectively, $$delta\_V1 = \frac{(|P5 - P1| + |P5 - P9|)}{2}$$

$$delta\_V2 = \frac{(|P2 - P7| + |P3 - P8|)}{2}$$

and the vertical directional information V_comp is computed by the following Formula using the delta_V1 and delta_V2, the P1, P2, P3, P5, P8 and P9 being pixel values in a Bayer pattern image regardless of R, G and B components $$V\_comp = delta\_V1 + delta\_V2.$$

9. The color interpolation method of claim 8, wherein delta_H1 and delta_H2 are computed by the following Formulas, respectively, $$delta\_H1 = \frac{(|P5 - P4| + |P5 - P6|)}{2}$$

$$delta\_H2 = \frac{(|P2 - P3| + |P7 - P8|)}{2}$$

and the vertical directional information H_comp is computed by the following Formula using the delta_H1 and delta_H2, the P1, P2, P3, P5, P8 and P9 being pixel values in a Bayer pattern image regardless of R, G and B components $$H\_comp = delta\_H1 + delta\_H2.$$

10. The color interpolation method of claim 2, wherein the plurality of predetermined conditions comprises:
a first condition, in which the vertical directional information is larger than a first threshold and the horizontal directional information is larger than a second threshold;
a second condition, in which the vertical directional information is larger than the horizontal directional information; and
a third condition, satisfying neither the first condition nor the second condition.

11. The color interpolation method of claim 10, wherein if the computed edge directional information satisfies the first condition and an R component is a center pixel in an RG line of the Bayer pattern image, parameters Gwn, Gws, Ges, Gen, Gout and Bout are computed by the following Formulas in the step of (e):

$$Gwn = \frac{(G1 + G3 + G6 + G4)}{4}$$

$$Gws = \frac{G6 + G8 + G11 + G9}{4}$$

-continued $$Ges = \frac{(G7 + G9 + G12 + G10)}{4}$$

$$Gen = \frac{(G2 + G4 + G7 + G5)}{4}$$

$$Gout = R3 + \frac{(Kr1 + Kr2 + Kr3 + Kr4)}{4}$$

$$Bout = Gout - \frac{(Kb1 + Kb2 + Kb3 + Kb4)}{4}.$$

12. The color interpolation method of claim 10, wherein if the computed edge directional information satisfies the first condition and a G component is a center pixel in a GB line of the Bayer pattern image, parameters Gn, Gw, Gs, Ge Rout and Bout are computed by the following Formulas in the step of (e):

$$Gn = \frac{(G1 + G2 + G5 + G3)}{4}$$

$$Gw = \frac{(G2 + G4 + G7 + G5)}{4}$$

$$Gs = \frac{(G5 + G7 + G9 + G8)}{4}$$

$$Ge = \frac{(G3 + G5 + G8 + G6)}{4}$$

$$Rout = G5 - \frac{(Kr1 + Kr2)}{2}$$

$$Bout = G5 - \frac{(Kb1 + Kb2)}{2}.$$

13. The color interpolation method of claim 10, wherein if the computed edge directional information satisfies the second condition and an R component is a center pixel in an RG line of the Bayer pattern image, parameters Gwn, Gws, Ges, Gen, Gout and Bout are computed based on the grid noise offset g_offset by the following Formulas in the step of (e):

$$Gwn = \frac{(G3 + G4)}{2}$$

$$Gws = \frac{(G3 + G9)}{2}$$

$$Ges = \frac{(G9 + G10)}{2}$$

$$Gen = \frac{(G4 + G5)}{2}$$

$$Gout = R3 + \frac{(Kr2 + Kr4)}{2} - g\_offset$$

$$Bout = Gout - \frac{(Kb1 + Kb2 + Kb3 + Kb4)}{4} + g\_offset.$$

14. The color interpolation method of claim 10, wherein if the computed edge directional information satisfies the second condition and an G component is a center pixel in a GB line of the Bayer pattern image, parameters Gwn, Gws, Ges, Gen, Rout and Bout are computed based on the grid noise offset g_offset by the following Formulas in the step of (e):

$$Gn = \frac{(G2 + G3)}{2}$$

-continued $$Gw = \frac{(G4 + G5)}{2}$$

$$Gs = \frac{(G7 + G8)}{2}$$

$$Ge = \frac{(G5 + G6)}{2}$$

$$Rout = G5 - \frac{(Kr1 + Kr2)}{2} - g\_offset$$

$$Bout = Gout - \frac{(Kb1 + Kb2 + Kb3 + Kb4)}{4} - g\_offset.$$

15. The color interpolation method of claim 10, wherein if the computed edge directional information satisfies the third condition and an R component is a center pixel in an RG line of the Bayer pattern image, parameters Gn, Gw, Gs, Ge, Gout and Bout are computed based on the grid noise offset g_offset by the following Formulas in the step of (e):

$$Gwn = \frac{(G1 + G6)}{2}$$

$$Gws = \frac{(G6 + G11)}{2}$$

$$Ges = \frac{(G7 + G12)}{2}$$

$$Gen = \frac{(G2 + G7)}{2}$$

$$Gout = R3 + \frac{(Kr1 + Kr3)}{2} + g\_offset$$

$$Bout = Gout - \frac{(Kb1 + Kb2 + Kb3 + Kb4)}{4} + g\_offset.$$

16. The color interpolation method of claim 10, wherein if the computed edge directional information satisfies the third condition and a G component is a center pixel in a GB line of the Bayer pattern image, parameters Gwn, Gws, Ges, Gen, Rout and Bout are computed based on the grid noise offset g_offset by the following Formulas in the step of (e):

$$Gn = \frac{(G1 + G5)}{2}$$

$$Gw = \frac{(G2 + G7)}{2}$$

$$Gs = \frac{(G5 + G9)}{2}$$

$$Ge = \frac{(G3 + G8)}{2}$$

$$Rout = G5 - \frac{(Kr1 + Kr2)}{2} + g\_offset$$

$$Bout = G5 - \frac{(Kb1 + Kb2)}{2} - g\_offset.$$

17. The color interpolation method of claim 6, wherein if a G component is a center pixel in a GB line of the Bayer pattern image, a parameter Gout are computed based on the grid noise offset g_offset by the following Formulas in the step of (e):

$$Gout = G5 - g\_offset.$$

18. A color interpolation device considering grid noise and edge direction, comprising:
   a noise setting unit, setting a grid noise coefficient corresponding to a Bayer pattern image;
   a grid noise offset computing unit, computing a grid noise offset by using the grid noise coefficient set by the noise setting unit;
   an edge directional information computing unit, extracting a pixel value only from the Bayer pattern image regardless of R, G and B values and computing edge directional information;
   an directional information condition determining unit, determining a condition of the edge directional information, computed in the edge directional information computing unit, among a plurality of predetermined conditions, each of the plurality of predetermined conditions corresponding to a color interpolation parameter computing algorithm and the grid noise offset being used as a parameter of the color interpolation parameter computing algorithm corresponding to each of the conditions; and
   a parameter computing unit, computing a color interpolation parameter based on the color interpolation parameter computing algorithm corresponding to the condition of the edge directional information, determined by the edge directional information condition determining unit.

19. The color interpolation device of claim 18, wherein the edge directional information computing unit comprises a horizontal directional information computing unit, computing edge horizontal directional information, and a vertical directional information computing unit, computing edge vertical directional information.

20. The color interpolation device of claim 18, wherein the grid noise coefficient setting unit set the grid noise coefficient differently depending on the cases of an R component being a center pixel in an RG line and a G component being a center pixel in a GB line.

21. The color interpolation device of claim 20, wherein the grid noise coefficient is set by computing an average value of each line of a Bayer pattern image, computing a line estimation value by use of the computed average value and using information computing the difference between the average value and the estimation value.

22. The color interpolation device of claim 21, wherein the grid noise coefficient is set as shown in the following matrix in the case of the R component being the center pixel in the RG line

| 0 | 11 | 0 | 11 | 0 |
|---|---|---|---|---|
| −21 | 0 | −21 | 0 | −21 |
| 0 | 41 | 0 | 41 | 0 |
| −21 | 0 | −21 | 0 | −21 |
| 0 | 11 | 0 | 11 | 0 | and is set as shown in the following matrix in the case of the G component being the center pixel in the GB line

| 7 | 0 | 7 | 0 | 7 |
|---|---|---|---|---|
| 0 | −32 | 0 | −32 | 0 |
| 28 | 0 | 28 | 0 | 28 |
| 0 | −32 | 0 | −32 | 0 |
| 7 | 0 | 7 | 0 | 7 |

23. The color interpolation device of claim 21, wherein if the R component is the center pixel in the RG line, the grid noise offset computing unit computes the grid noise offset g_offset by a value which is evaluated by allowing the Bayer pattern image matrix to be multiplied by the grid noise coefficient matrix,
   whereas if the grid noise offset is larger than a predetermined threshold, the grid noise offset computing unit resets the grid noise offset by the following Formula:

$g\_offset = sign(g\_offset) \times g\_threshold$ and the sign (g_offset) is outputted as 1 if the computed grid noise offset is larger than zero, as −1 if the grid noise offset is smaller than zero and as zero if the grid noise offset is zero.

24. The color interpolation device of claim 22, wherein if the G component is the center pixel in the GB line, the grid noise offset computing unit computes the grid noise offset g_offset by a value which is evaluated by allowing the Bayer pattern image matrix to be multiplied by the grid noise coefficient matrix,
   whereas if the grid noise offset is larger than a predetermined threshold, the grid noise offset computing unit resets the grid noise offset by the following Formula:

$g\_offset = sign(g\_offset) \times g\_threshold$ and the sign (g_offset) is outputted as 1 if the computed grid noise offset is larger than zero, as −1 if the grid noise offset is smaller than zero and as zero if the grid noise offset is zero.

25. The color interpolation device of claim 19, wherein delta_V1 and delta_V2 are computed by the following Formulas, respectively, $$\text{delta\_V1} = \frac{(|P5 - P1| + |P5 - P9|)}{2}$$

$$\text{delta\_V2} = \frac{(|P2 - P7| + |P3 - P8|)}{2}$$

and the vertical directional information V_comp is computed by the following Formula using the delta_V1 and delta_V2, the P1, P2, P3, P5, P8 and P9 being pixel values in a Bayer pattern image regardless of R, G and B components $V\_comp = \text{delta\_}V1 + \text{delta\_}V2.$ 26. The color interpolation device of claim 25, wherein delta_H1 and delta_H2 are computed by the following Formulas, respectively, $$\text{delta\_H1} = \frac{(|P5 - P4| + |P5 - P6|)}{2}$$

$$\text{delta\_H2} = \frac{(|P2 - P3| + |P7 - P8|)}{2}$$

and the vertical directional information H_comp is computed by the following Formula using the delta_H1 and delta_H2, the P1, P2, P3, P5, P8 and P9 being pixel values in a Bayer pattern image regardless of R, G and B components $H\_comp = \text{delta\_}H1 + \text{delta\_}H2.$ 27. The color interpolation device of claim 19, wherein the plurality of predetermined conditions comprises: a first condition, in which the vertical directional information is larger than a first threshold and the horizontal directional information is larger than a second threshold;
a second condition, in which the vertical directional information is larger than the horizontal directional information; and
a third condition, satisfying neither the first condition nor the second condition.

28. The color interpolation device of claim 27, wherein if the computed edge directional information satisfies the first condition and an R component is a center pixel in an RG line of the Bayer pattern image, the parameter computing unit computes parameters Gwn, Gws, Ges, Gen, Gout and Bout by the following Formulas:

$$Gwn = \frac{(G1 + G3 + G6 + G4)}{4}$$

$$Gws = \frac{G6 + G8 + G11 + G9}{4}$$

$$Ges = \frac{(G7 + G9 + G12 + G10)}{4}$$

$$Gen = \frac{(G2 + G4 + G7 + G5)}{4}$$

$$Gout = R3 + \frac{(Kr1 + Kr2 + Kr3 + Kr4)}{4}$$

$$Bout = Gout - \frac{(Kb1 + Kb2 + Kb3 + Kb4)}{4}.$$

29. The color interpolation device of claim 27, wherein if the computed edge directional information satisfies the first condition and a G component is a center pixel in a GB line of the Bayer pattern image, the parameter computing unit computes parameters Gn, Gw, Gs, Ge Rout and Bout by the following Formulas:

$$Gn = \frac{(G1 + G2 + G5 + G3)}{4}$$

$$Gw = \frac{(G2 + G4 + G7 + G5)}{4}$$

$$Gs = \frac{(G5 + G7 + G9 + G8)}{4}$$

$$Ge = \frac{(G3 + G5 + G8 + G6)}{4}$$

$$Rout = G5 - \frac{(Kr1 + Kr2)}{2}.$$

30. The color interpolation device of claim 27, wherein if the computed edge directional information satisfies the second condition and an R component is a center pixel in an RG line of the Bayer pattern image, the parameter computing unit computes parameters Gwn, Gws, Ges, Gen, Gout and Bout based on the grid noise offset g_offset by the following Formulas:

$$Gwn = \frac{(G3 + G4)}{2}$$

$$Gws = \frac{(G8 + G9)}{2}$$

$$Ges = \frac{(G9 + G10)}{2}$$

$$Gen = \frac{(G4 + G5)}{2}$$

$$Gout = R3 + \frac{(Kr2 + Kr4)}{2} - g\_offset$$

$$Bout = Gout - \frac{(Kb1 + Kb2 + Kb3 + Kb4)}{4} + g\_offset.$$

31. The color interpolation device of claim 27, wherein if the computed edge directional information satisfies the second condition and an G component is a center pixel in a GB line of the Bayer pattern image, the parameter computing unit computes parameters Gwn, Gws, Ges, Gen, Rout and Bout based on the grid noise offset g_offset by the following Formulas:

$$Gn = \frac{(G2 + G3)}{2}$$

$$Gw = \frac{(G4 + G5)}{2}$$

$$Gs = \frac{(G7 + G8)}{2}$$

$$Ge = \frac{(G5 + G6)}{2}$$

$$Rout = G5 - \frac{(Kr1 + Kr2)}{2} - g\_offset$$

$$Bout = Gout - \frac{(Kb1 + Kb2 + Kb3 + Kb4)}{4} - g\_offset.$$

32. The color interpolation device of claim 27, wherein if the computed edge directional information satisfies the third condition and an R component is a center pixel in an RG line of the Bayer pattern image, the parameter computing unit computes parameters Gn, Gw, Gs, Ge, Gout and Bout based on the grid noise offset g_offset by the following Formulas:

$$Gwn = \frac{(G1 + G6)}{2}$$

$$Gws = \frac{(G6 + G11)}{2}$$

$$Ges = \frac{(G7 + G12)}{2}$$

$$Gen = \frac{(G2 + G7)}{2}$$

$$Gout = R3 + \frac{(Kr1 + Kr3)}{2} + g\_offset$$

$$Bout = Gout - \frac{(Kb1 + Kb2 + Kb3 + Kb4)}{4} + g\_offset.$$

33. The color interpolation device of claim 27, wherein if the computed edge directional information satisfies the third condition and a G component is a center pixel in a GB line of the Bayer pattern image, the parameter computing unit computes parameters Gwn, Gws, Ges, Gen, Rout and Bout based on the grid noise offset g_offset by the following Formulas $$Gn = \frac{(G1 + G5)}{2}$$

$$Gw = \frac{(G2 + G7)}{2}$$

$$Gs = \frac{(G5 + G9)}{2}$$

-continued $$Ge = \frac{(G3 + G8)}{2}$$

$$Rout = G5 - \frac{(Kr1 + Kr2)}{2} + g\_offet$$

$$Bout = G5 - \frac{(Kb1 + Kb2)}{2} - g\_offset.$$

34. The color interpolation device of claim 23, wherein if a G component is a center pixel in a GB line of the Bayer pattern image, the parameter computing unit computes a parameter Gout based on the grid noise offset g_offset by the following Formulas:

$$Gout = G5 - g\_offset.$$

* * * * *